United States Patent
Huff et al.

[11] Patent Number: 6,106,275
[45] Date of Patent: Aug. 22, 2000

[54] MOLDING PRESS APPARATUS

[75] Inventors: Edward F. Huff, Wadsworth; Robert L. Brown, Hartville; David E. Baxter, deceased, late of Ravenna, by Carol Baxter, Gregory L. Baxter, Jeffrey A. Baxter, Mark A. Baxter, Pamela K. Stone, Steven W. Baxter, heirs; Gregory L. Baxter, Ravenna, all of Ohio; Walter Hunnicut, Ft. Wayne, Ind.

[73] Assignee: GenCorp Inc., Sacramento, Calif.

[21] Appl. No.: 08/299,678

[22] Filed: Sep. 1, 1994

[51] Int. Cl.[7] ............................................. B29B 45/28
[52] U.S. Cl. ........................ 425/563; 425/190; 425/569; 425/574
[58] Field of Search ................................. 425/183, 190, 425/574, 568, 569, 563; 249/102

[56] References Cited

U.S. PATENT DOCUMENTS

| | | | |
|---|---|---|---|
| 2,359,840 | 10/1944 | Goessling | 18/30 |
| 2,442,607 | 6/1948 | Leguillon et al. | 425/543 |
| 2,624,071 | 1/1953 | Strahm et al. | 425/568 X |
| 3,464,091 | 9/1969 | Bielfeldt | 425/574 |
| 4,124,343 | 11/1978 | Makinson et al. | 425/574 X |
| 4,183,778 | 1/1980 | Mesnel | 156/245 |
| 4,284,464 | 8/1981 | Forster | 456/510 |
| 4,362,496 | 12/1982 | Uhlig | 425/379 R |
| 4,386,903 | 6/1983 | Wybenga | 425/574 X |
| 4,822,269 | 4/1989 | Kamiyama et al. | 425/568 X |
| 4,959,002 | 9/1990 | Pleasant | 425/192 R |
| 5,007,816 | 4/1991 | Hehl | 425/574 X |
| 5,040,969 | 8/1991 | Von Buren et al. | 425/574 X |
| 5,149,485 | 9/1992 | Belcher | 425/523 X |
| 5,173,234 | 12/1992 | Figuereo | 264/148 |
| 5,275,547 | 1/1994 | Brown | 425/129.1 |
| 5,370,516 | 12/1994 | Brunsman et al. | 425/183 X |
| 5,427,514 | 6/1995 | Horibe et al. | 425/563 X |

FOREIGN PATENT DOCUMENTS

| | | |
|---|---|---|
| 2141886 | of 0000 | France . |
| 2361991 | of 0000 | France . |
| 2561573 | of 0000 | France . |
| 1529766 | of 0000 | Germany . |
| 1554847 | of 0000 | Germany . |
| 2041451 | of 0000 | Germany . |
| 62-25023 | of 0000 | Japan . |
| 62-25023 | 2/1987 | Japan . |
| 721217 | of 0000 | United Kingdom . |

*Primary Examiner*—Elizabeth McKane
*Attorney, Agent, or Firm*—Calfee, Halter & Griswold LLP

[57] ABSTRACT

An injection press apparatus for molding/joining separate parts. The apparatus having a work table with first and second work stations for injecting material into a mold. A movable extruder/injection assembly is provided which has an extruder portion for extruding material, and an injection portion for injecting material. The extruder portion and injection portion are in fluid communication such that material is provided from the extruder portion to the injection portion prior to injection of material from the injection portion to the mold. The injection portion of extruder/injection assembly has a nozzle assembly for receiving and injecting material from the injection portion to a self-actuating mold clamp assembly at the first or second work stations. The first and second work stations support the mold clamp assembly which receives the molding material. The extruder/injection assembly is movable between the first and second work stations by a shuttle assembly.

12 Claims, 19 Drawing Sheets

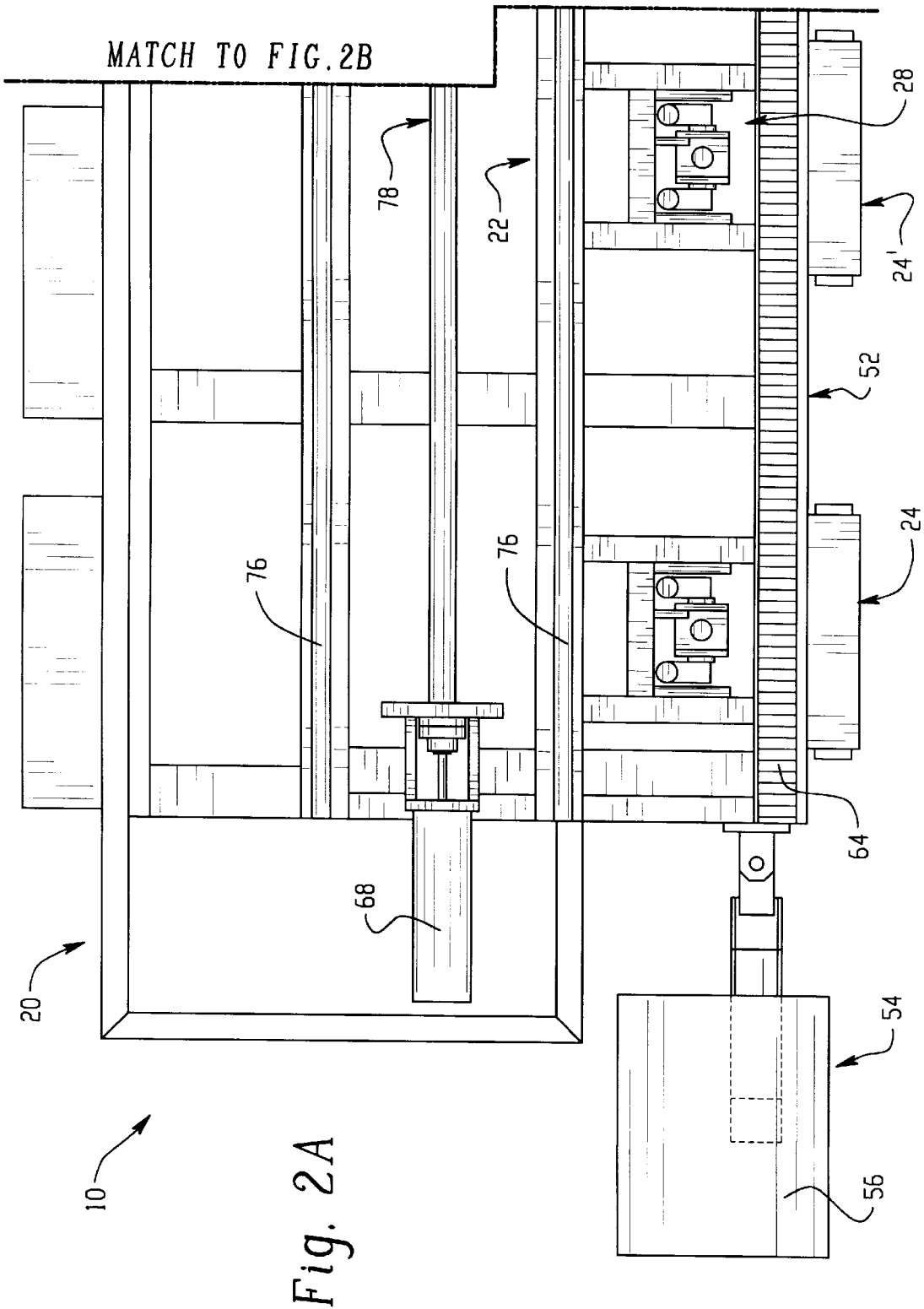

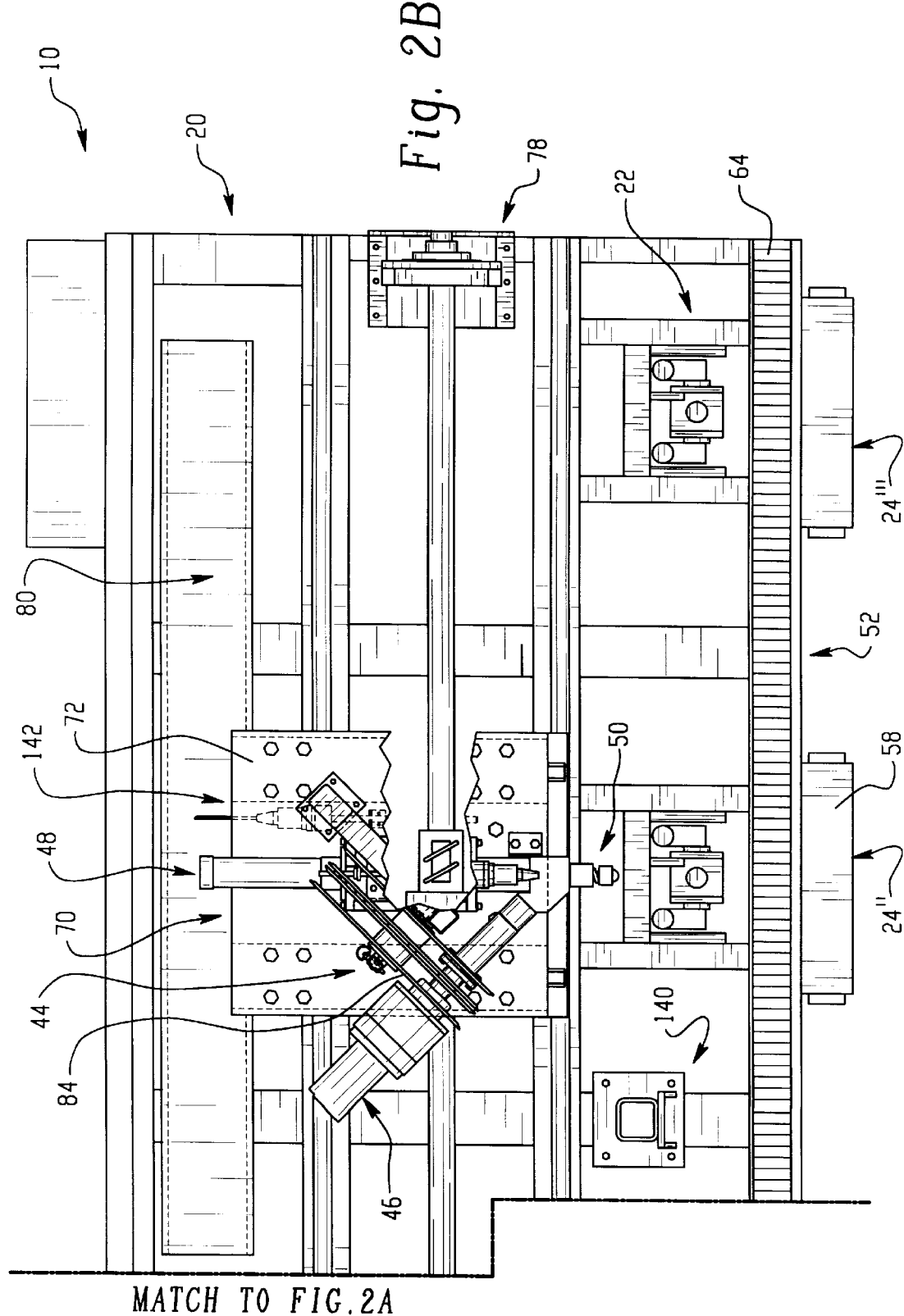

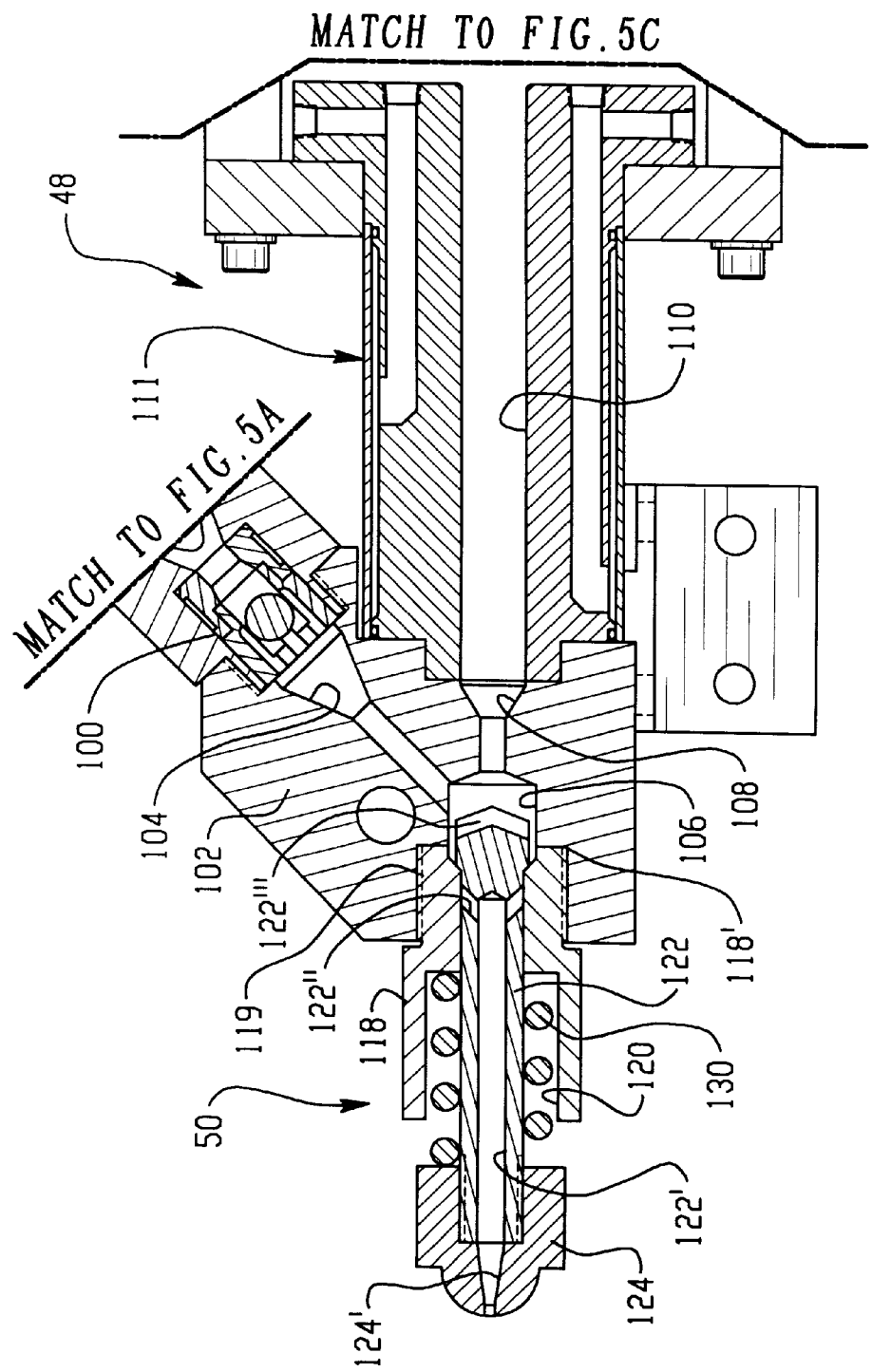

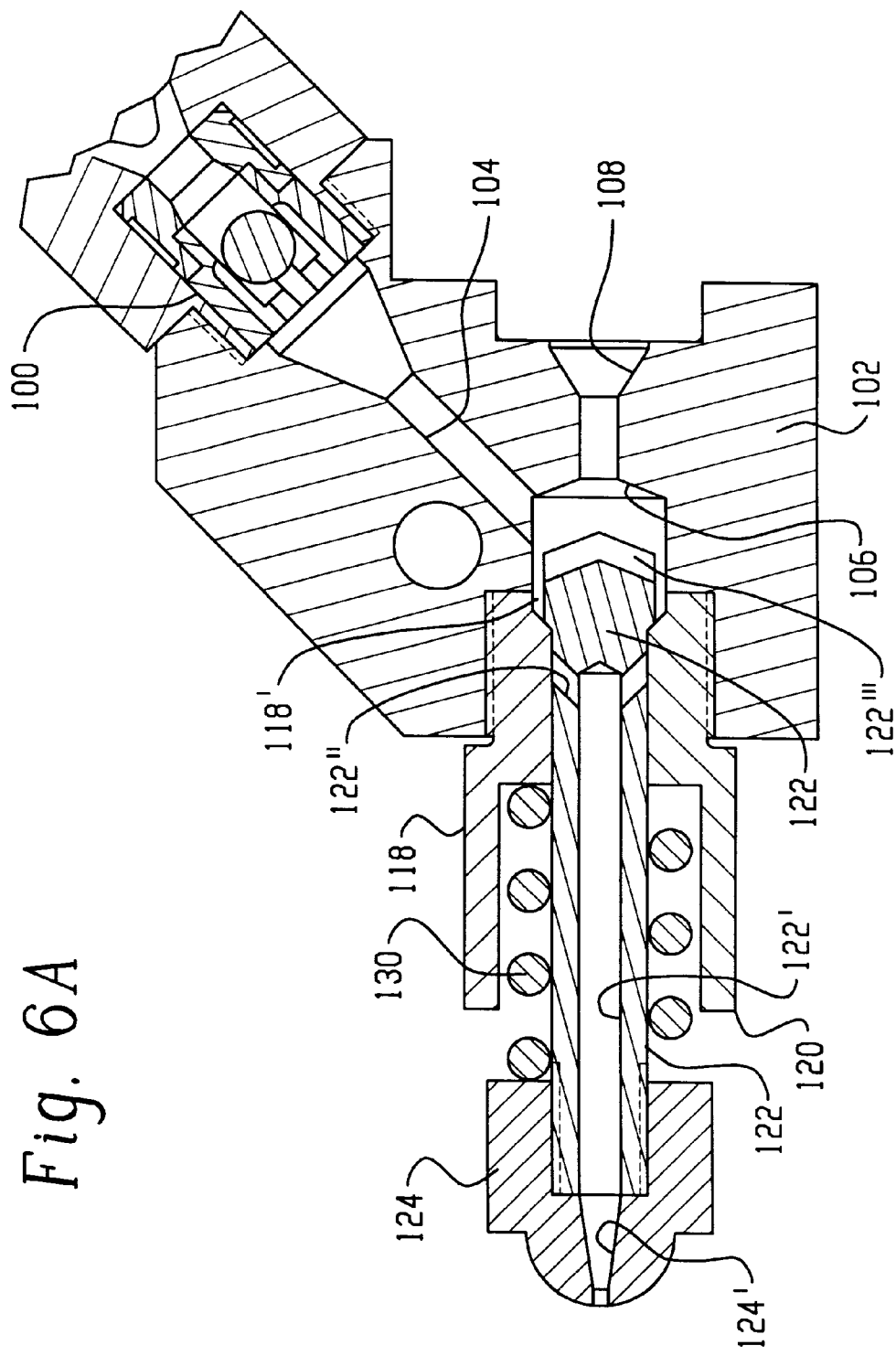

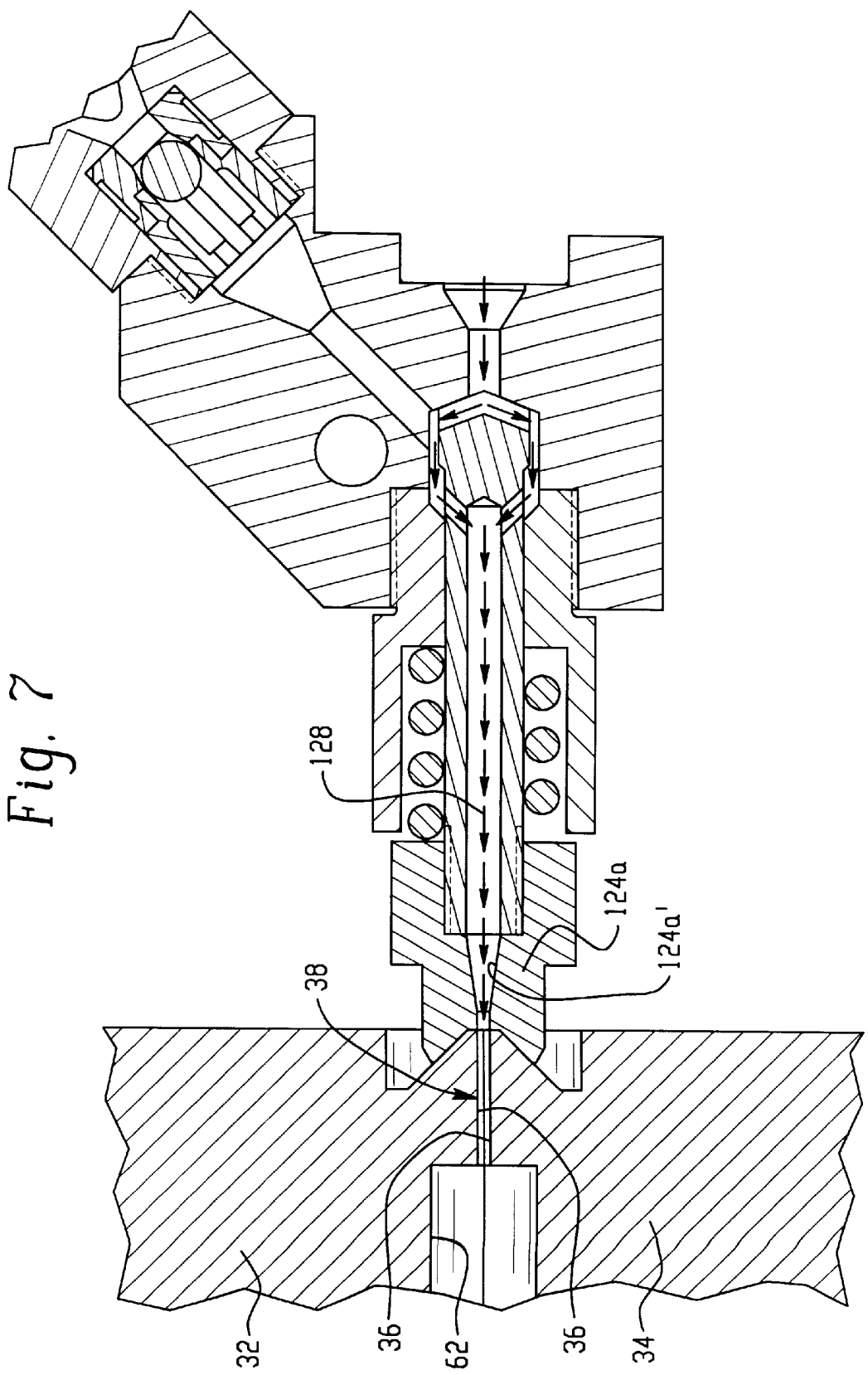

MOLDING PRESS APPARATUS

TECHNICAL FIELD

The present application relates to a molding press for molding separate work pieces using a movable extruder/injection assembly, and more specifically to an injection molding apparatus for joining work pieces at two or more work stations where the extruder/injection assembly is provided to the work stations to supply the extrudate material.

BACKGROUND

The components of an injection molding system typically include a stock supply assembly, an extruder assembly, an injection assembly, a mold and a clamping assembly. In a typical molding process, the stock supply assembly supplies a certain amount of stock material to the extruder assembly. The extruder assembly processes or plasticizes the stock material into injection material, and conveys the desired amount of material to the injection assembly. Upon clamping of the mold within the clamping assembly under the force necessary for successful molding, the injection assembly injects the injection material into a mold cavity within the mold.

The mold is usually formed by two joinable/separable mold portions. When an insert molding procedure is used in an injection molding machine, the mold portions are initially separated and an unfinished insert or work piece is loaded into one of the mold portions. The mold portions are then joined together to form the mold cavity.

Once the mold cavity is formed, the mold is clamped under the necessary force to hold the unfinished insert or work pieces in position during operation of the injection assembly, which injects the molding material into the mold cavity. A portion of the mold is then opened or removed and the molded product having the previously unfinished, now molded part and insert or joined work pieces, are unloaded from the mold cavity.

In the past, the molding of separate elongate molded or extruded pieces to form a single part has been performed using adhesives. The use of adhesives for joining such parts has the disadvantage that undesirable fumes or other materials may result from the use of such adhesives. Also, the use of adhesives at an operator work station typically results in messy work stations. Still further, cosmetic improvements may be required to be made to the parts once they are joined by the adhesives.

Alternatively, separate machined or cast molds have been used which provide components for receiving the work pieces to be joined together. Such molding processes may result in an unattractive "step off" or discontinuous joint line between the work pieces being molded and the molded joint material. Also, conventional molding procedures typically require additional finish processing to remove flash from the articles. The formation of flash, and its removal, result in increased costs due to wasted material, and the additional labor required to remove or deflash the articles for finishing. In either of these operations, an additional quality control inspection of each article may also be required, which further increases overall labor expense.

SUMMARY OF THE APPARATUS

The present application provides a new and improved molding press for molding work pieces using a movable extruder/injection assembly. The use of the present apparatus permits the joining of several work pieces at multiple work stations, at which a single extruder/injection assembly is moved to engage the respective work stations. The use of the injection molding apparatus to join work pieces eliminates the use of potentially hazardous materials near the operator, such as the adhesives which are used in the prior art processes. Additionally, the use of an injection molding process to join work pieces improves product quality due to the superior temperature strength of an injection molded joint, as compared to a joint formed by adhesives. The improved appearance of work pieces joined by injection molding also results in reduced labor due to the reduction of cosmetic or finish work required to be performed on the completed parts.

The present molding press apparatus includes a work table and a movable extruder/injection assembly. The work table has at least two work stations, each supporting a self-actuating mold clamp assembly having mounting structure for engagement with the work pieces to be joined or molded. The mold clamp assembly has a clam shell type mold which is configured for opening and closing to allow the operator of the apparatus easy viewing of both the top and bottom portions of the mold. The mounting structure for supporting the work pieces to be joined includes mold inserts which may be quickly changed to accommodate work pieces having a variety of overall or profile configurations. Heating elements may be located within the mounting structure to assist with additional curing of the molding material being injected. As used herein, the term "cure" is intended to include treatment by the application of heat, pressure, or other material treatments whereby the molding process is completed and the material to be molded attains its finished condition.

The movable extruder/injection assembly includes a stock supply portion, an extruder portion, and an injection portion having a nozzle assembly for injecting molding material into the self-actuating mold clamp assembly. Several embodiments of the nozzle assembly of the apparatus are illustrated in the present application. A universal removable check valve is provided in the extruder portion to prevent back flow of injection material to the extruder portion during injection. A spring biased check valve is also provided in the nozzle assembly for preventing nozzle leakage during plasticizing following injection.

The extruder/injection assembly is moved between the work stations by a shuttle assembly. In the illustrated assembly, injection portion of the extruder/injection assembly is positioned horizontally on the shuttle assembly. However, the use of a vertical injector which would also enable the injection of dual materials is also possible. The use of a single movable extruder/injection assembly reduces the labor costs resulting from multiple handling, conveying and storage of stock or feed supplies which are provided to the extruder portion of the assembly for injection.

In the example of the present apparatus, the molding press apparatus is configured for joining two elongate work pieces of extrudate, and the mounting structure is shaped to match the finished product requirements. As illustrated, the cross-sectional configuration of the mounting structure typically matches that of the work pieces, and may have any overall configuration desired to form the joint between the two work pieces. However, the apparatus may be adapted for many insert molding procedures other than joint molding, such as small part products. The extruder/injection assembly is particularly well adapted to deliver small shot sizes of injection material, such as approximately 25 grams or less, accurately and repeatedly.

The molding press apparatus for molding work pieces specifically includes a main frame supporting the shuttle assembly. The shuttle assembly includes a support plate assembly which supports the extruder/injection assembly. A flexible cable and hose carrier is also provided for flexibly supporting the hydraulic and electrical cable components operating the apparatus. The support plate assembly is movably engaged on linear bearing tracks with a traversing ball screw assembly for moving the assembly. A positioning servo-drive assembly is also provided for locating the support plate assembly at the proper work table position.

The self-actuating mold clamping assembly includes mounting structure which may be quickly changed to accommodate additional alternative structure for molding alternate work pieces. The quick change mounting structure is supported on the clamping assembly within a top mold plate and a bottom mold plate. The mold plates each include sprue channels forming a sprue opening. The mold plates are additionally movable between open position for receiving the work pieces within the mounting structure in open position, and clamped or closed position for clamping the work pieces within the mounting structure to form a mold cavity.

In the open position, the operator of the apparatus inserts the work pieces to be molded within the mounting structure prior to the injection operation. The mold plates of the clamping assembly are movable such that either or both of the plates tilts when opened to enable the operator a clear view of, and access to, the work station, as well as reducing the potential for physical injury to the operator in the form of carpel tunnel injury.

The work pieces are supplied to the operator for use in the work stations by a feed conveyor system. The conveyor system is positioned adjacent the work stations to enable the ready supply of work pieces to the operator at each of the work stations.

Once the work pieces are engaged, the top and bottom mold plates are moved to the closed position, and the nozzle assembly may then be moved into engagement with the sprue opening of the first work station for the injection operation. Once completed, the mold plates are moved to the open position, and may be tipped to enable the ready removal of the molded parts from the clamping assembly by the operator. The tipping of the mold plates assists the operator in insertion and removal of the work pieces, and reduces the potential for physical injury to the operator resulting from the repetitive nature of the insertion and removal tasks.

The conveyor system of the apparatus is then used by the operator to remove the completed work pieces from the work station to another location for additional processing.

Following completion at the first work station, this process is performed successively at each of the multiple work stations of the present apparatus. Upon completion of the injection molding procedure at each successive work station, the extruder/injection assembly is returned to its initial starting position and the first work station using the shuttle assembly, and the injection process performed at each work station is repeated.

A control system is also provided for automatically or manually controlling operation of the apparatus, such as system and component pressures, speeds, temperatures, cycle time and injection volumes. Certain features of the apparatus, such as changing the feed roll of the stock supply portion as the supply is depleted, inserting the work pieces to be joined into the mounting structure, and activating the dual palm buttons to operate the apparatus, must be manually performed by the operator.

Other features and advantages of the present synchronous manufacturing apparatus, which integrates individual work station operations in-line with the extrusion process, will become apparent from the following detailed description of the preferred embodiment made with reference to the accompanying drawings, which form a part of the specification.

BRIEF DESCRIPTION OF DRAWINGS

FIGS. 2A–2B are a schematic top view, partially cut-away, of the molding press apparatus of FIGS. 1A–1B;

FIGS. 5A–5C are cut-away top views of the extruder and injection portions of the movable extruder/injection apparatus of FIG. 4;

FIG. 6A is a cut-away top view of the nozzle assembly of the movable extruder/injection apparatus of FIG. 5B, shown in a closed position to prevent the flow of molding material from the nozzle assembly;

FIG. 7 is an alternate embodiment of the nozzle assembly of the movable extruder/injection apparatus of this application, shown in an open position engaged with the self-actuating mold clamp assembly for receiving the flow of molding material from the nozzle assembly;

DETAILED DESCRIPTION OF THE BEST MODE OF THE APPARATUS

Figure 1A:
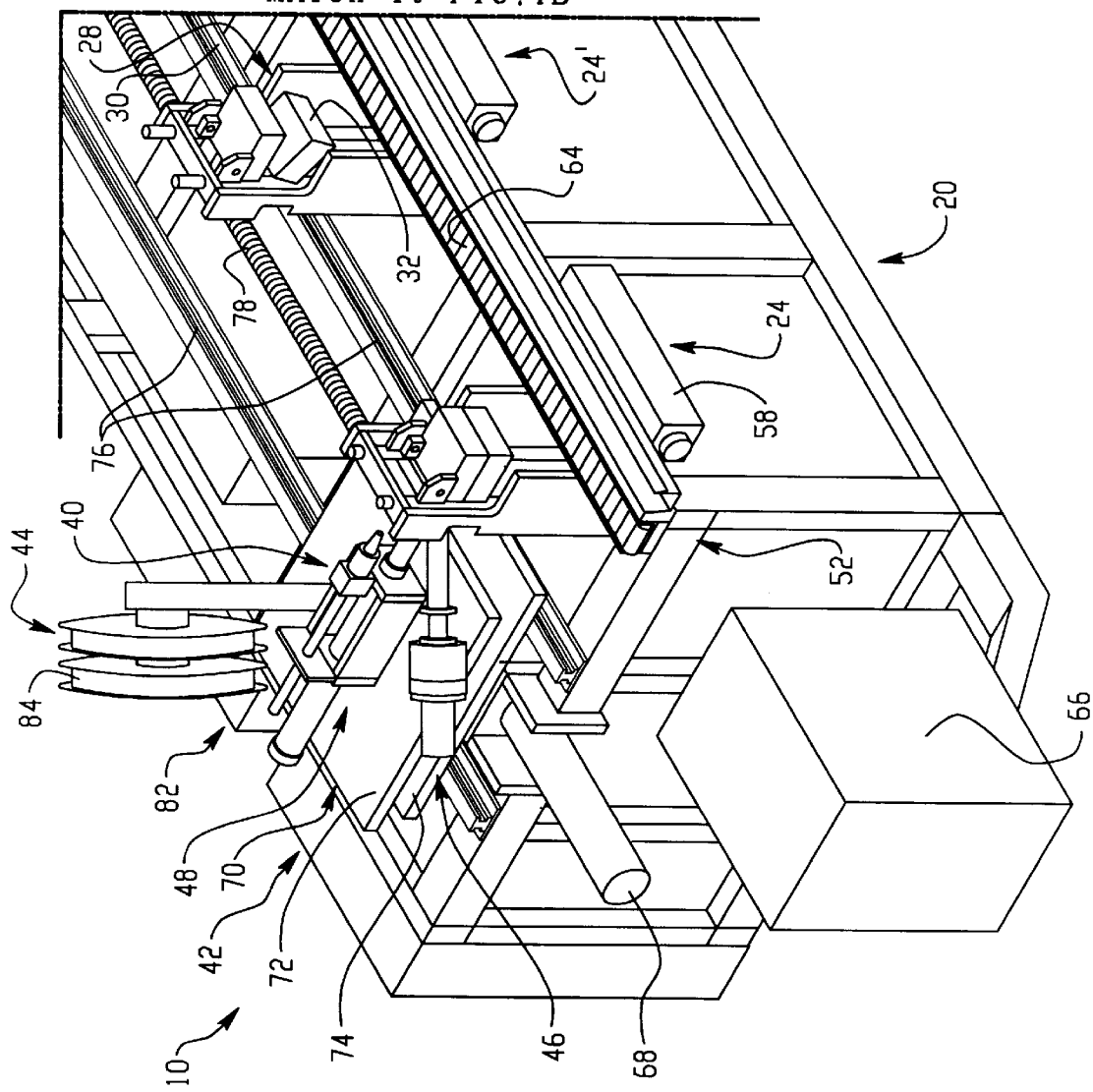
FIGS. 1A–1B are a schematic, perspective view of the molding press apparatus of the present application.
Figure 1B:
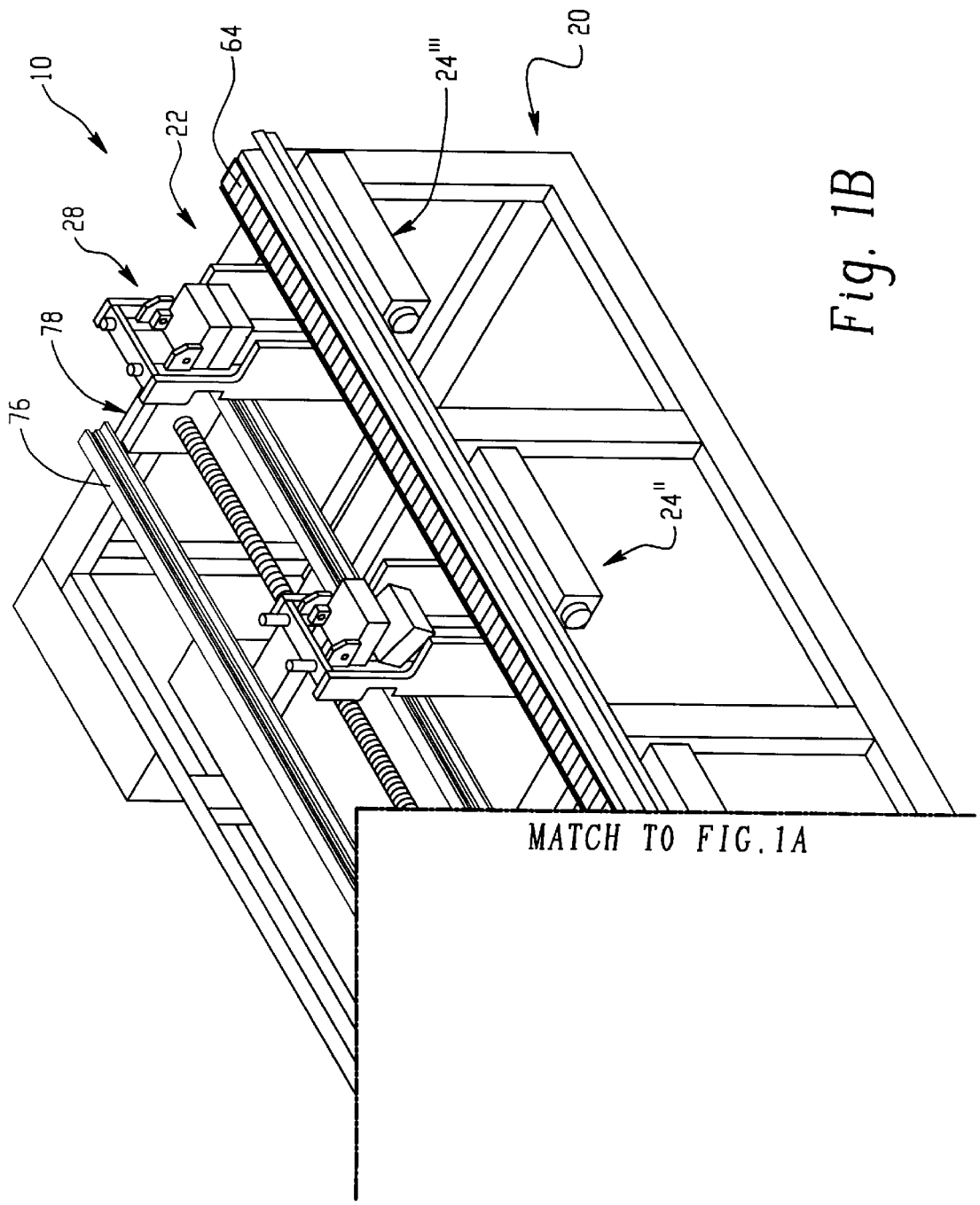
Figure 3:
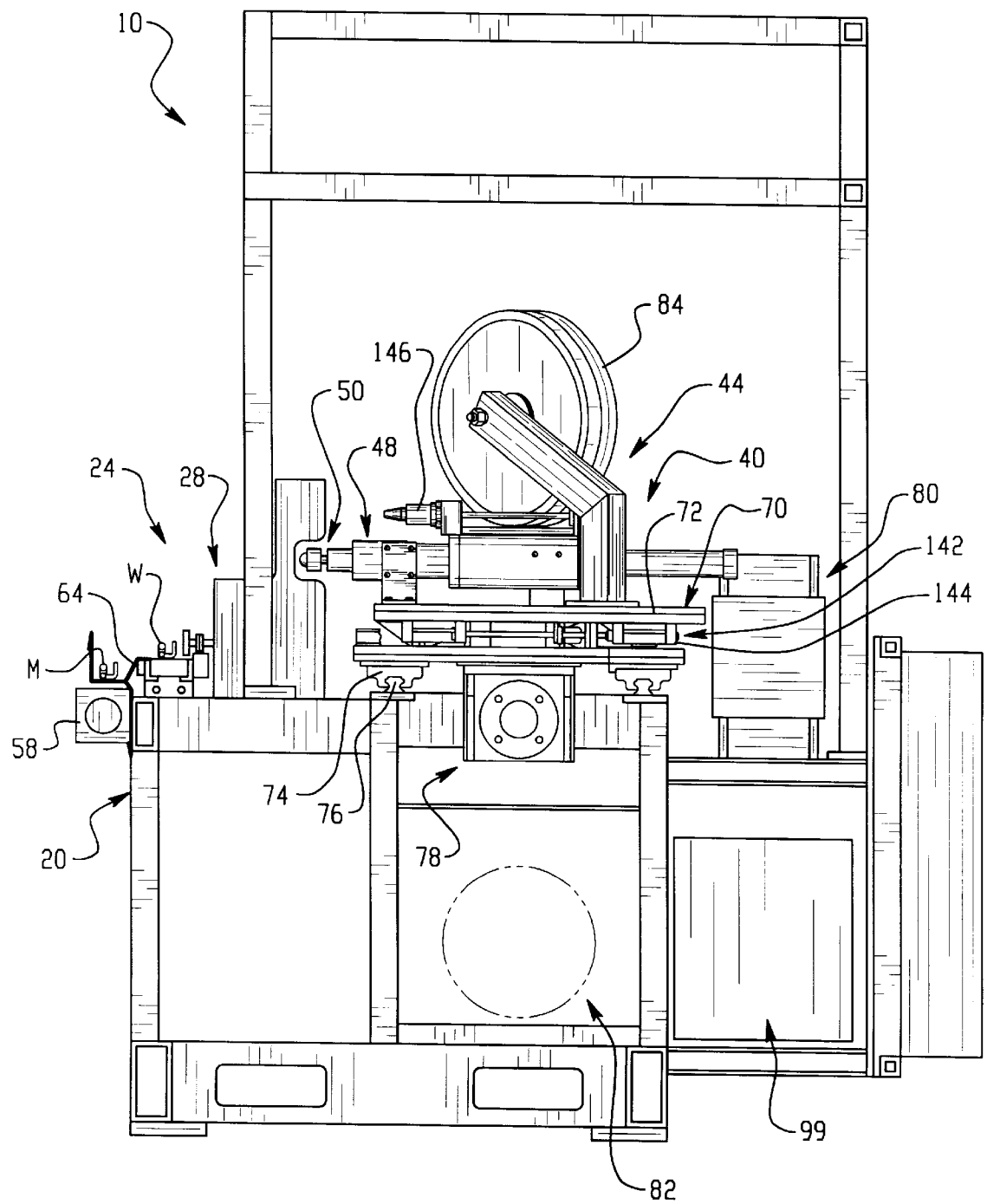
FIG. 3 is a schematic end view of the molding press apparatus of FIGS. 1A–1B.
Figure 3A:
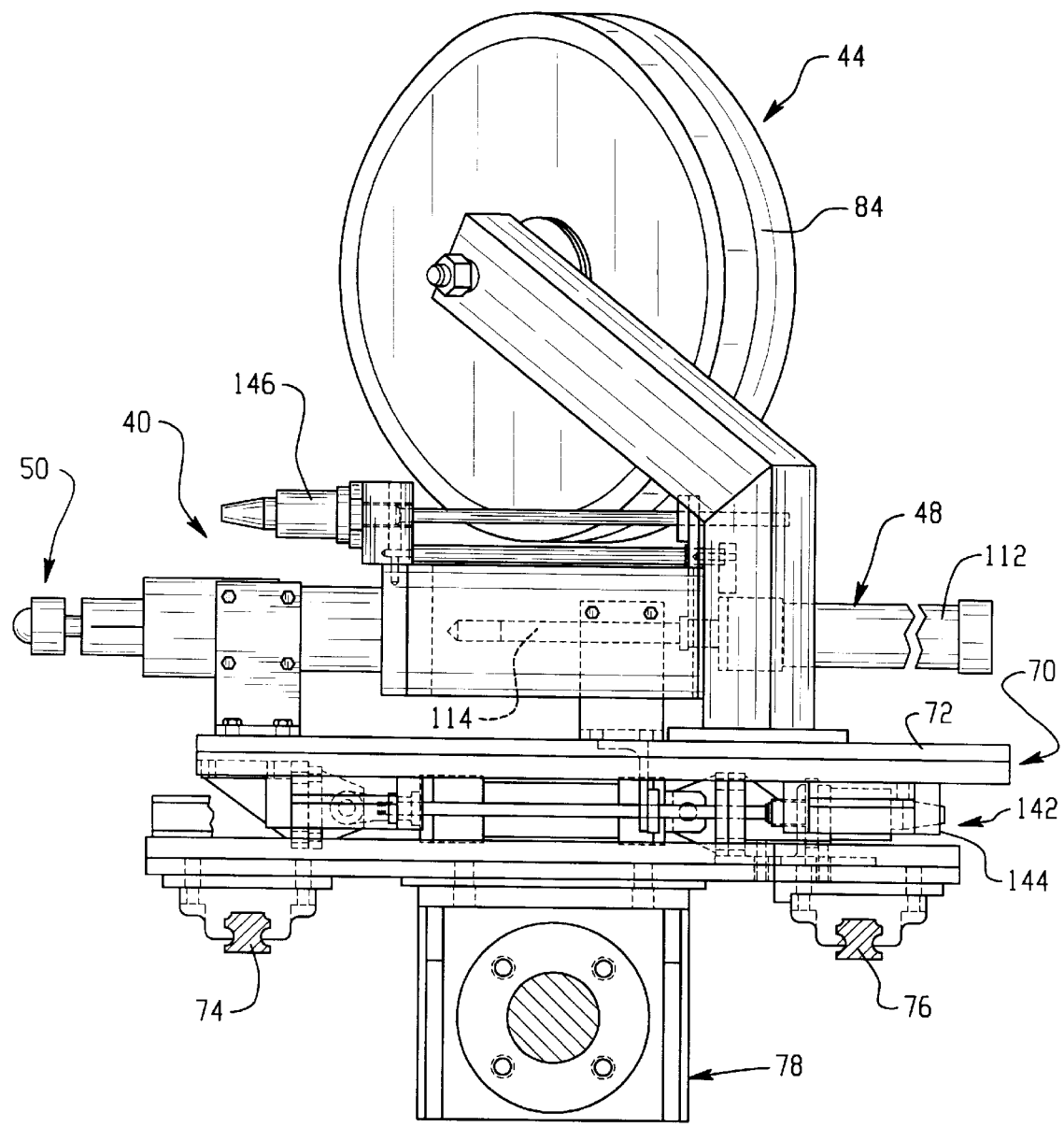
FIG. 3A is a schematic enlarged view of a portion of the movable extruder/injection apparatus of FIG. 3.
Figure 4:
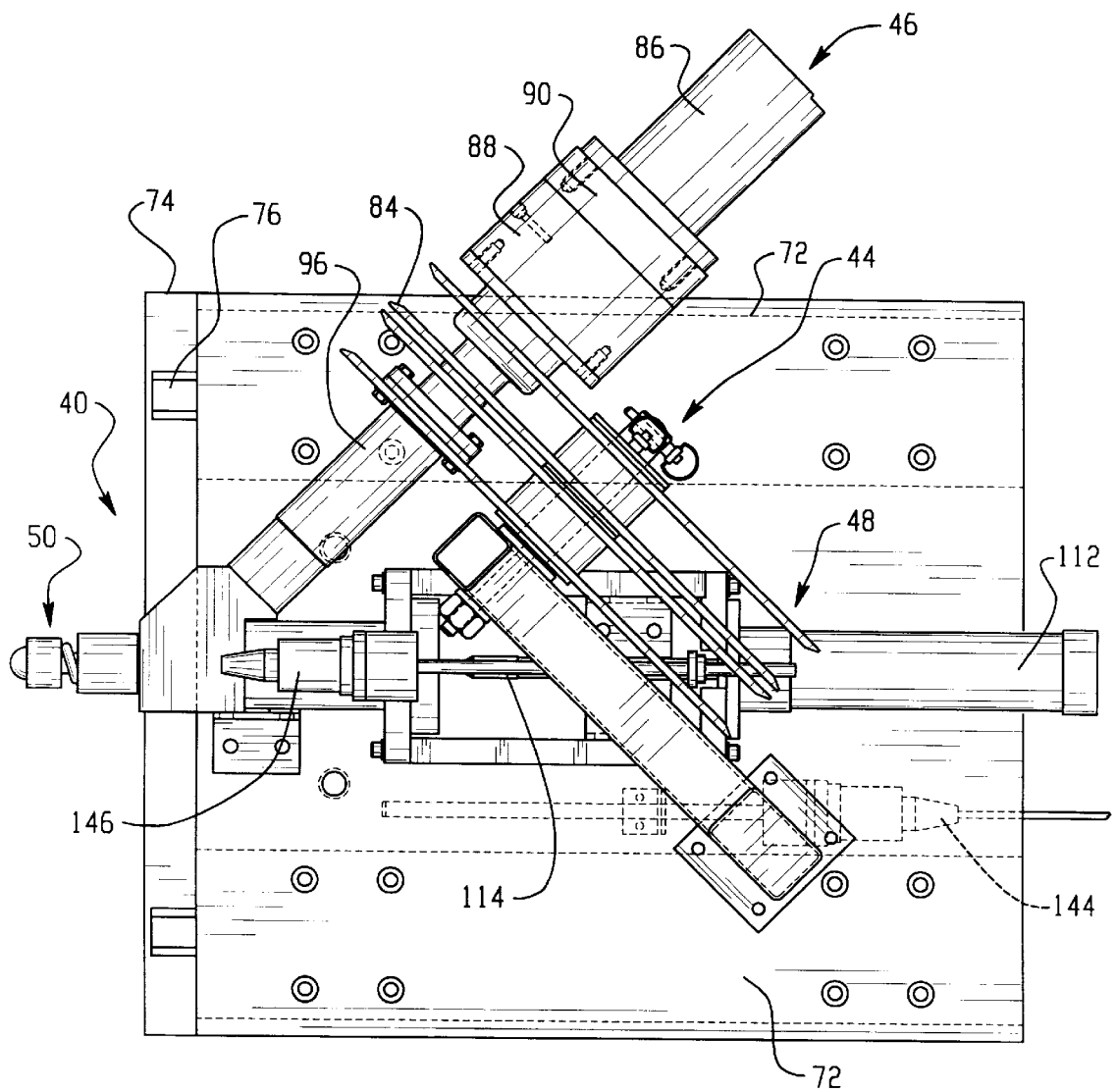
FIG. 4 is a schematic top view of the movable extruder/injection apparatus of FIG. 3A.
Figure 9:
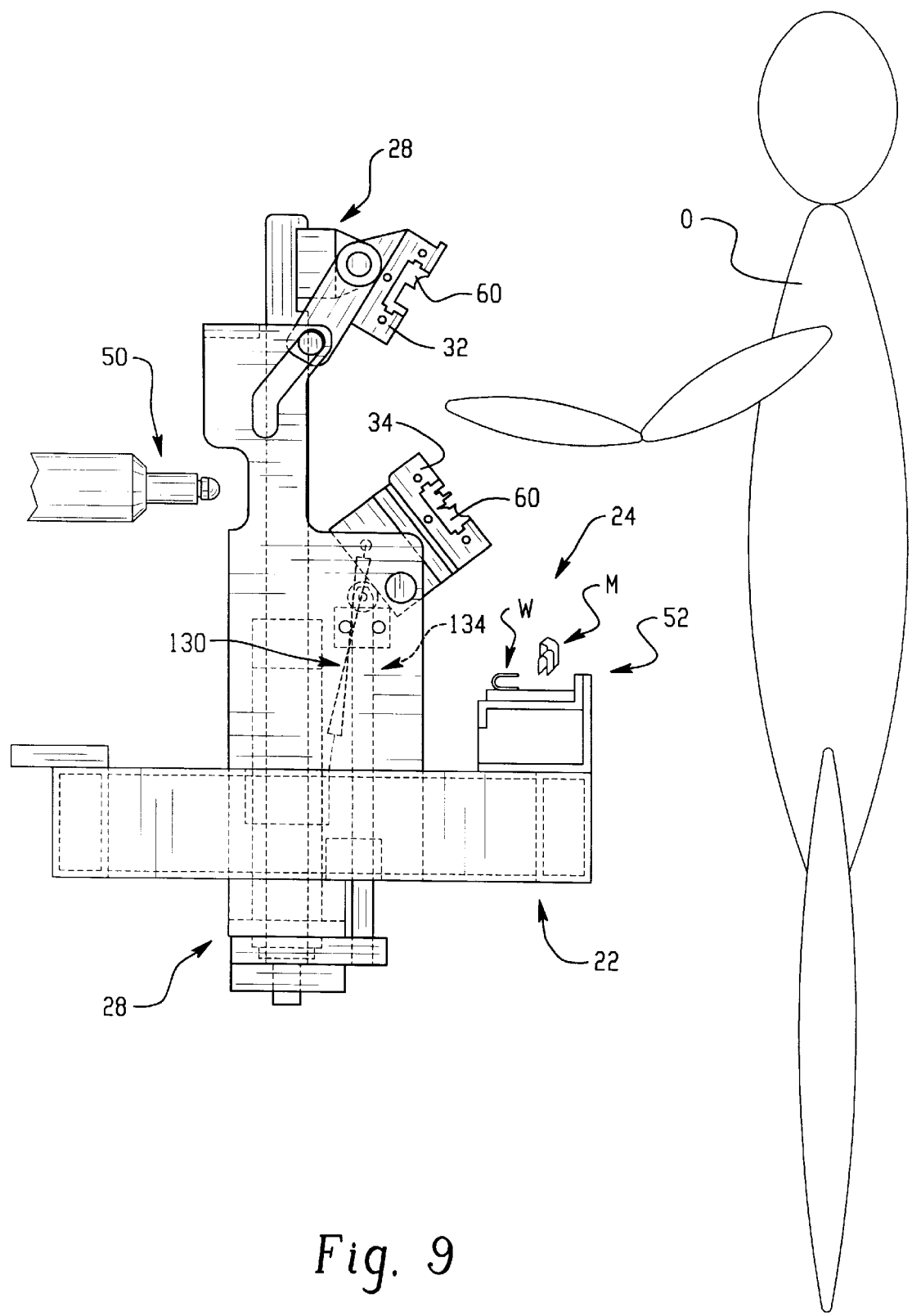
FIG. 9 is a schematic, side view of an open work station of the molding press apparatus of this application.

FIGS. 1A–1B illustrate an improved molding press apparatus. The molding press apparatus, generally referred to at reference numeral 10 in the illustrated embodiment, is preferably capable of injection molding a joint for two work pieces W of elongate extrudate material to form a molded part M. The molded part M is illustrated in FIG. 9. The apparatus includes a work table 22 having work stations 24, a movable extruder/injection assembly 40, moved by a shuttle assembly 42, and having a stock supply portion 44, an extruder portion 46 for extruding material and an injection portion 48 having a nozzle assembly 50 for injecting material. Each of the work stations 24 includes a self-actuating mold clamp assembly for receiving the injection material from the nozzle assembly 50. A conveyor system 52 supplies the apparatus with work pieces W, and removes the molded parts M once completed. A control system 54 provides computerized control all aspects of operation of the apparatus 10.

The illustrated molding press apparatus is supported on a main frame 20 forming the work table 22 with the work stations 24. In the illustrated embodiment the apparatus includes four work stations. It should be understood that additional work stations could also be added. As each of the work stations illustrated are substantially identical, the work stations will be referred to with additional prime designations, and only differences between the work stations will be discussed in further detail.

Each of the work stations 24 has a self-actuating mold clamp assembly 28. The clamp assembly 28 incldes split mold having a top mold plate 30 which mates with a bottom mold plate 32. As shown, for example in FIG. 7, each of the top and bottom mold plates 32, 34 includes a sprue channel 36, which when the clamp assembly 28 is in the closed or clamped position, form a sprue opening 38. The sprue opening 38 provides a pathway for the injection molding material to flow from the extruder/injection assembly 40 to the clamping assembly 28.

The molding material is provided to mounting structure which comprises removable, quick change mold inserts 60 of the type generally illustrated in FIG. 9. The mold inserts 60 are readily removable to enable the rapid replacement of the inserts for installation of alternate inserts having the desired cross-sectional configuration for receiving the work pieces or forming the joint.

Figure 10:
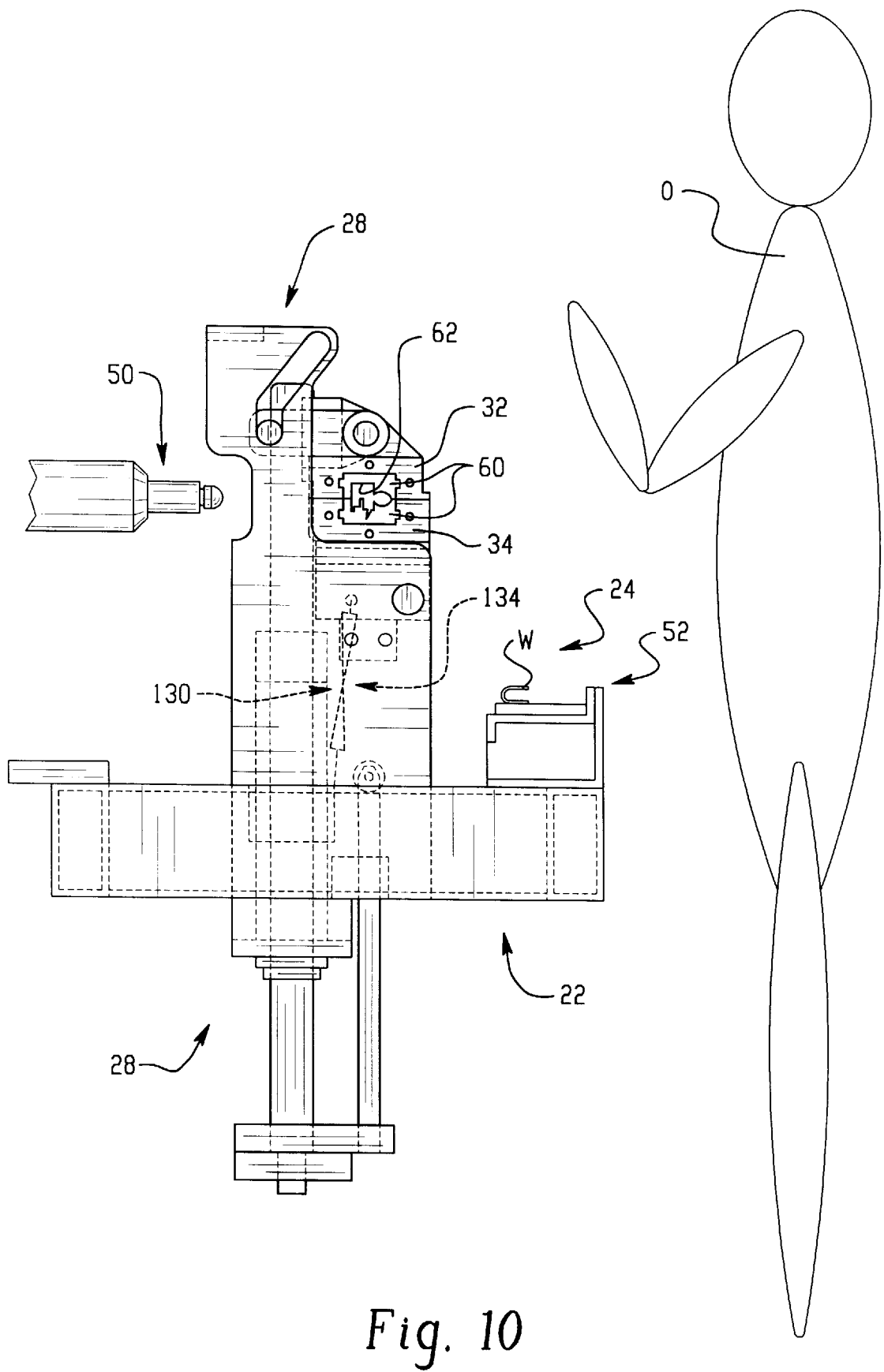
FIG. 10 is a schematic, side view of a closed work station of the molding press apparatus of this application.
Figure 11:
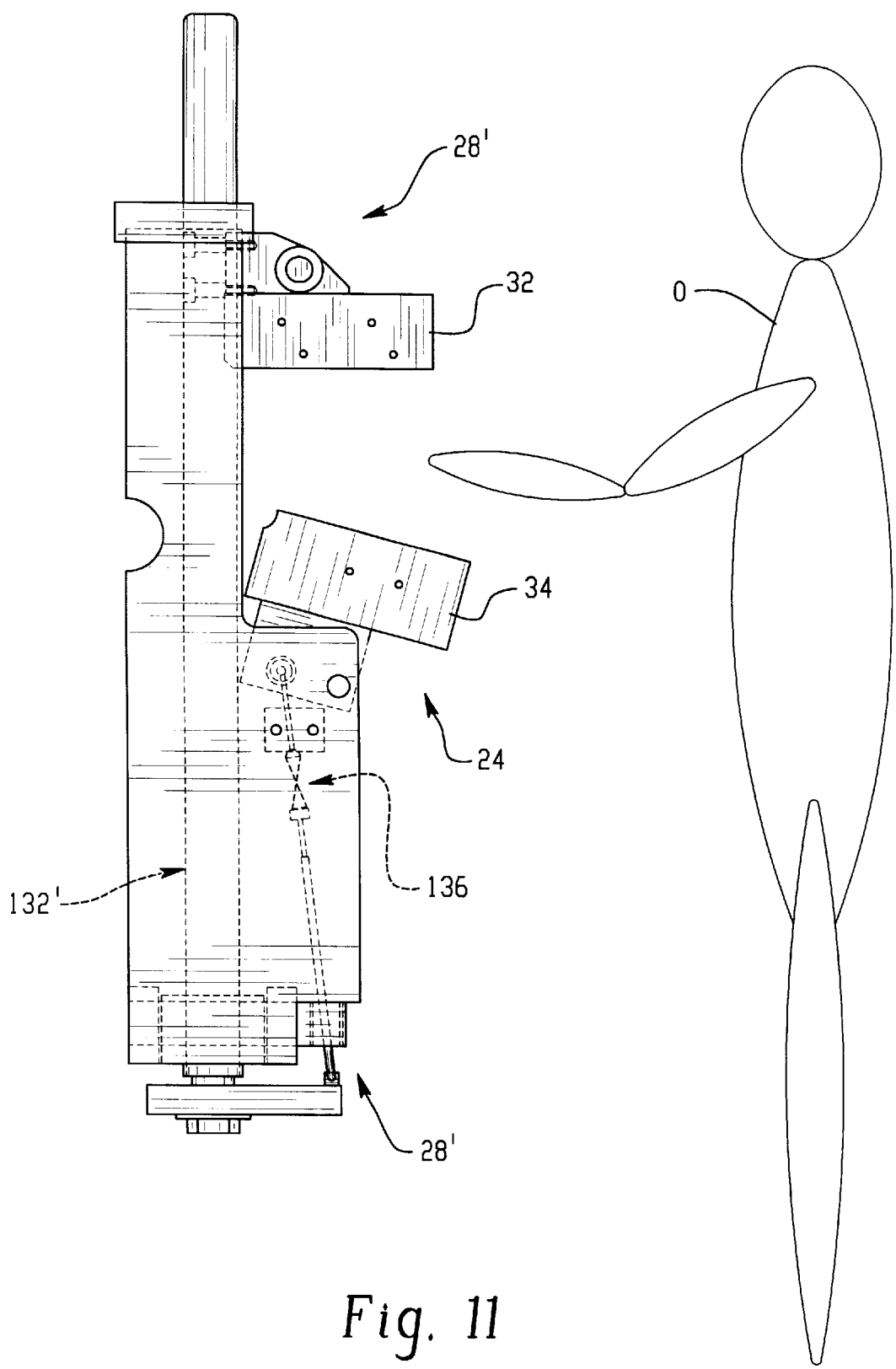
FIG. 11 is a schematic, side view of an alternate embodiment of an open work station of the molding press apparatus of this application.
Figure 12:
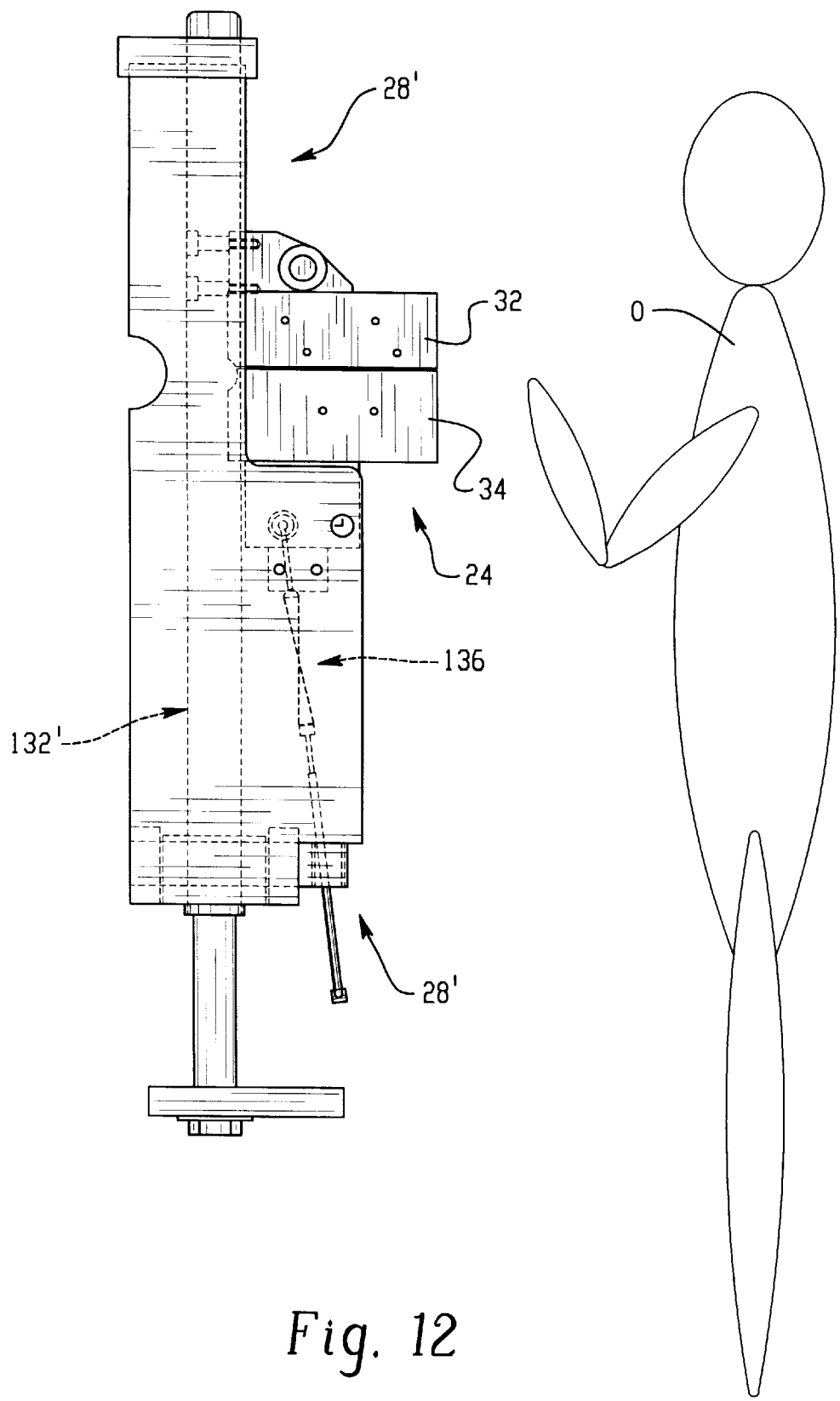
FIG. 12 is a schematic, side view of an alternate embodiment of a closed work station of the molding press apparatus of this application.

The top and bottom mold plates 32, 34 move between an open position of the type shown in FIGS. 9 and 11, and the closed position of FIGS. 10 and 12. In the open position, the mounting structure inserts 60 are positioned for receiving the work pieces prior to the injection operation. In particular, the top and/or bottom mold plates may be tilted to a desired position to provide the apparatus operator O with sufficient hand space to insert the work pieces W into the mounting structure inserts 60. The embodiments illustrated in FIGS. 9 and 11 show the mold plates in open position. FIG. 9 shows both the top and bottom plates 32, 34 tilted at approximately 45 degrees. FIG. 11 shows the top plate in a fixed horizontal position, while the bottom plate is tilted at approximately 30 degrees. It should be understood that any amount of tilt may be provided to either or both of the top and bottom plates in order to accommodate several factors, including the varying sizes of the parts being molded, and the space required between the plates for the operator O to insert and remove the work pieces from between the plates. Where the space provided between the plates is small, increased tilt provides a larger access space for the operator O.

Once the work pieces W have been inserted into the mold inserts 60, the top and bottom mold plates 32, 34 may be moved to the closed position of FIGS. 10 and 12 in preparation for the injection molding operation. When the top and bottom mold plates are in the closed position, the mold inserts 60 and work pieces W form a mold cavity 62 for receiving the molding material forming the joint between the work pieces.

As shown in FIGS. 1A–1B, 3 and 9–10, the work pieces W are supplied to the operator O for use in the mounting structure inserts 60 of the work stations 24 by a feed conveyor system 52 having a belt 64. The conveyor system 52 is a conventional continuous belt apparatus which is located in front of the clamp assembly 28 of the work station 24. The belt 64 provides the operator O with work pieces W for insertion into the mounting structure inserts 60 for the injection operation.

Once the work pieces W are engaged within the mounting structure inserts 60, and the top and bottom mold plates 32, 34 are moved to the closed position, the extruder/injection assembly 40 is moved into position adjacent the work station 24 for the injection operation.

For the injection operation at each of the work stations 24, the shuttle assembly 42, under control of the control system 54, moves the extruder/injection assembly into position adjacent the desired work station 24. The shuttle assembly 42 is moved to the proper work station 24 location using a conventional servo-drive mechanism 68 as a positioning assembly. The extruder/injection assembly 40 is moved to the proper position supported on a support plate assembly 70. The support plate assembly 70 includes a support plate 72, having a bearing support 74 which engage and move horizontally on the linear bearing tracks 76. Intermediate the bearing support 74 and support plate 72 a portion of a position sensor assembly 142, interconnected with the control system 54 for corrective feed back purposes, is provided for determining the position of the nozzle and the volume of injection provided by the injection portion. The portion of the position sensor assembly 142 adjacent the support plate 72 includes a linear variable displacement transducer 144 for sensing nozzle position. A linear variable displacement transducer 146 for sensing the volume of material injected during the injection operation, is also provided secured to the nozzle assembly 50. Additionally, an adjustment assembly 80 is provided for overall adjustment of the support position.

The extruder/injection assembly 40 is moved horizontally along the work table on a traversing ball screw assembly 78. An integral hydraulic system 82 is also provided under main frame for providing hydraulic power to the various components of the apparatus 10.

The extruder/injection assembly 40 includes a stock supply portion 44, an extruder portion 46, and an injection portion 48 having a nozzle assembly 50. The stock supply portion 44 is supported on the support plate 72, and supports a stock feed reel 84 which maintains the molding material on a reel supported above the extruder portion 46. The stock feed reel 84 provides the extruder portion of the assembly 40 with a continuous supply of the necessary molding material.

The extruder portion 46 of the assembly 40 is a miniature conventional extruder device which includes a hydraulic motor 86. A bearing housing 88 is supported on the support plate 72 and interconnected with a coupling 90. The motor 86 drives the bearing member 92 via the coupling 90. The bearing member 92 is interconnected with the rotating extruder screw 94. In the illustrated embodiment the screw is 20 mm. The rotating extruder screw 94 is housed within the extruder barrel 96, which has a thermal jacket 98 to heat the extruder barrel and plasticize the extrudate material provided from the stock supply portion 44 to the extruder portion 46. A temperature regulator 99 for assisting with control of the molding material temperature is also provided. The regulator 99, illustrated in FIG. 3, controls the temperature of both the extruder and nozzle.

Figure 5A:
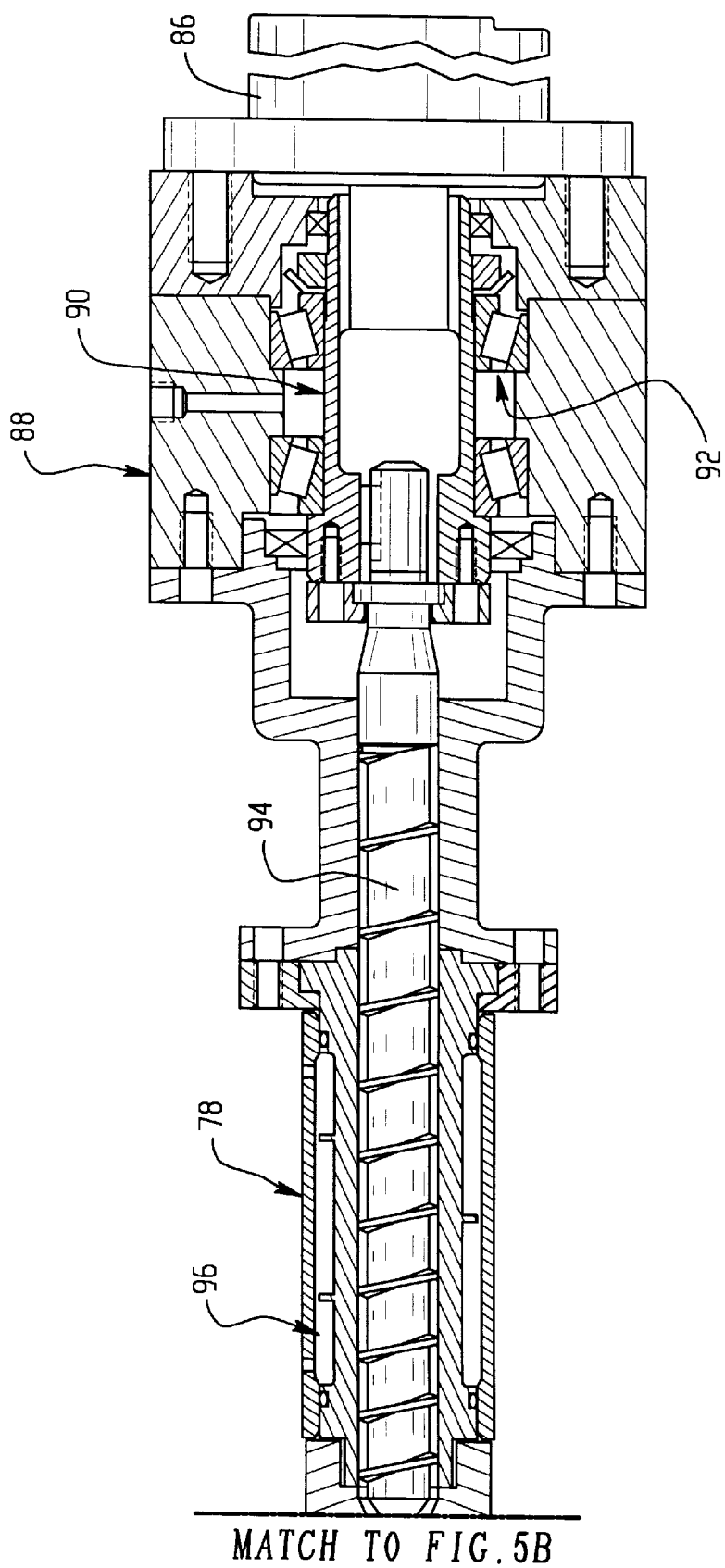
Figure 5C:
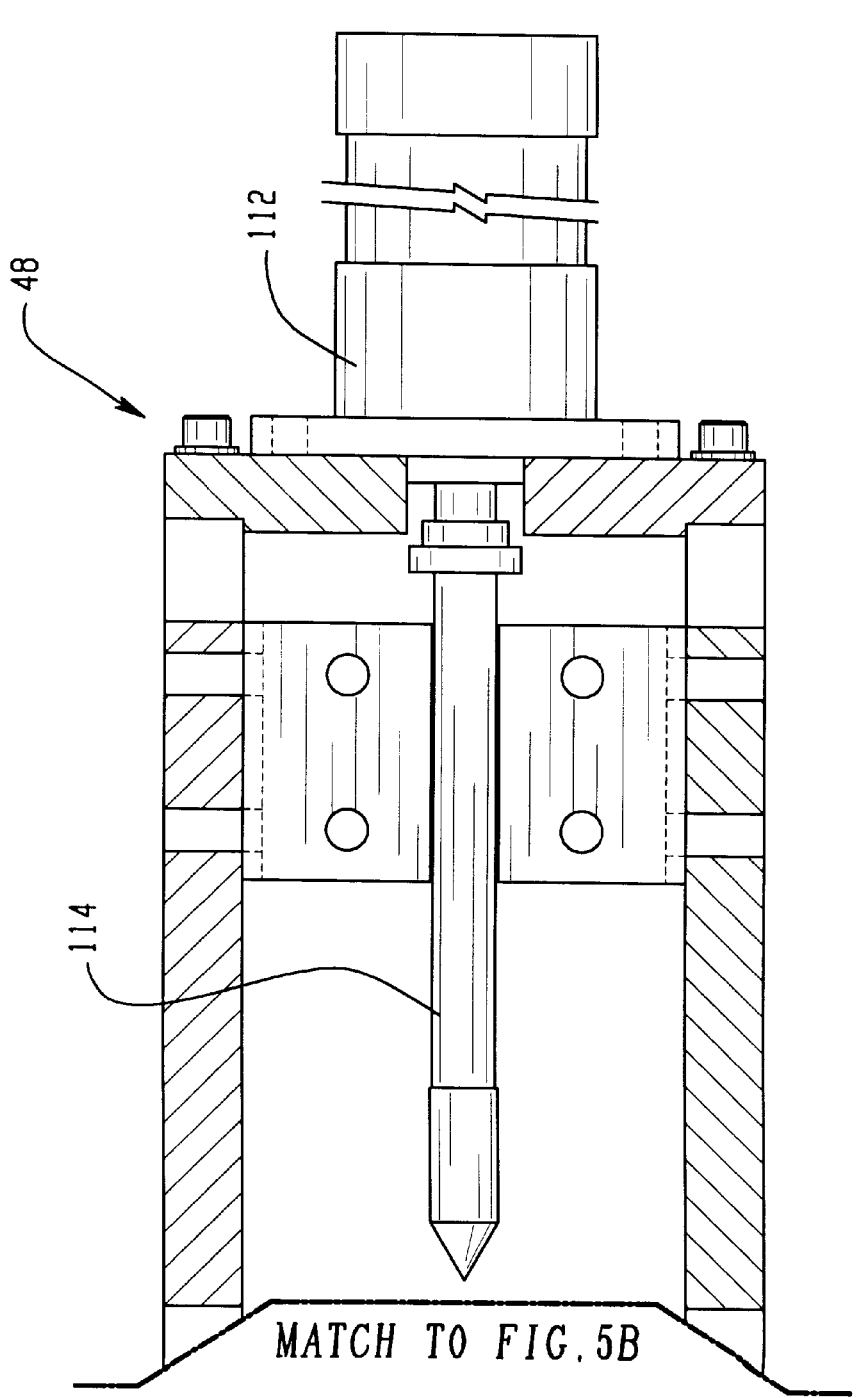

During operation of the extruder portion 46 which supplies extrudate material to the injection portion 48, the heated extrudate material passes through a removable ball type cartridge check valve 100, shown in FIG. 5B, which is biased to the open position to enable the passage of material. The valve 100 is removable to permit a variety of different sizes and configurations of valves to be used for the extrusion of different molding material. During injection of material from the injection portion 48 to the nozzle assembly 50, the check valve 100 is biased to the closed position to prevent the flow of material from the extruder portion 46 during injection.

The check valve 100 is interconnected with a union block 102, where extrudate material from the extruder is passed to the injection portion 48 during the filling of the injection portion 48 for the injection operation. The union block 102 is positioned to interconnect the extruder portion 46, injection portion 48 and the nozzle assembly 50. The union block 102 provides an extruder passage 104 from the extruder portion to the nozzle cavity 106, and an injection passage 108 from the nozzle cavity 106 to the injection portion 48.

During the filling of the an injection portion 48, the heated extrudate material flows from the extruder portion 46 to the extruder passage 104, the nozzle cavity 106, the injection passage 108, and into the injection portion 48. Extrudate material flows from the union block 102 and into the injection chamber 110 of the injection portion 48. The shot size of the injection chamber 110 varies according to the size of the part being molded. In the illustrated embodiments, the shot size varies from 5 cc to 25 cc, but could be used to higher size volumes.

The shot of extrudate material is provided to the nozzle assembly 50 by a hydraulic injector 112 having an interconnected piston ram 114. Upon initiation of the injection process, the injector biases the ram 114 into the injection chamber 110, which moves the molding material from the chamber 110 into the union block 102 injection passage 108 and the nozzle assembly 50. The injection chamber is surrounded by a thermal jacket 111 to maintain the material temperature.

During the filling of the injection chamber 110 the nozzle cavity 106 of the union block 102 is in fluid communication with the extruder portion 46. However, during the injection operation, the nozzle assembly 50 is biased into engagement with the self-actuating mold clamp assembly 28, which blocks passage of material from the extruder portion 46, and only permits the flow of material from the injection portion 48 to the nozzle assembly.

Figure 6B:
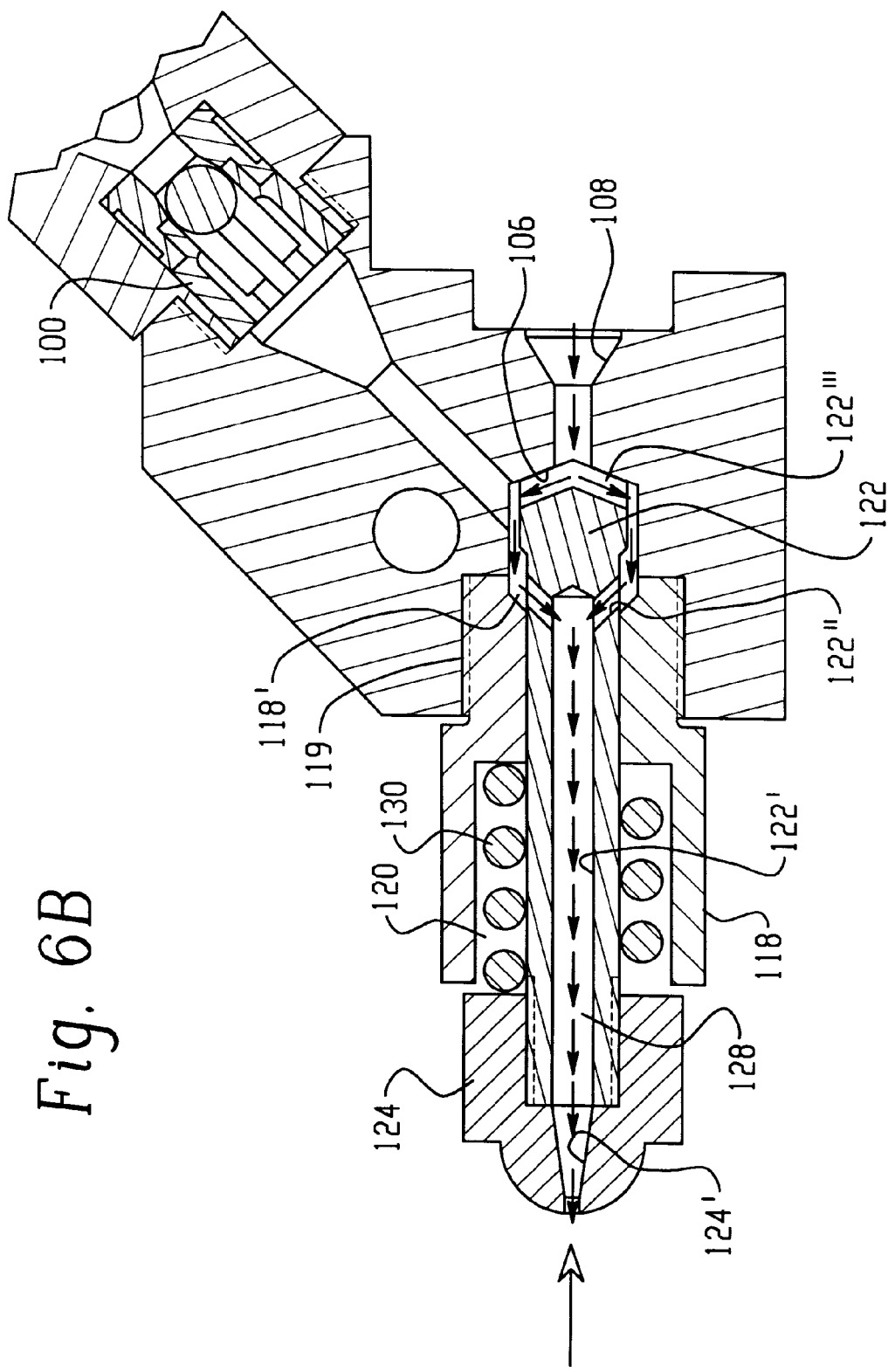
FIG. 6B is a cut-away top view of the nozzle assembly of the movable extruder/injection apparatus of FIG. 5B, shown in an open position to permit the flow of molding material from the nozzle assembly.

As illustrated in FIGS. 5B, 6A and 6B, a base portion 118 of the nozzle assembly 50 is in threaded engagement with the union block 102. Opposite the threaded engagement end 119 of the base portion 118 is a spring cavity or grooved portion 120 for receiving a spring member 130. A central shaft portion 122 and nozzle tip 124 are also provided. The central shaft portion 122 is engaged through the base portion, and in sliding relationship with the base portion 118 on a first end. A second end of central shaft portion is in threaded engagement with the nozzle tip 124. The nozzle tip 124 and base portion 118 each include a channel 124' and 118', respectively. The central shaft portion 122 additionally includes a central channel 122', a transverse channel 122" and an end groove 122'''. Together, the channels 118', 122'–122''', and 124' with the nozzle cavity 106, form a pathway 128 for receiving molding material during the injection process. The channel 124' of the nozzle tip 124 is positioned for engagement with the sprue opening 38 in the mold clamp assembly 28.

The spring member 130 of the nozzle assembly 50 is engaged intermediate the nozzle tip 124 on one end, and the base portion 118 on the other end. During the injection process, the nozzle tip 124 is spring biased into engagement with the mold clamp assembly 28. Compression of the spring member 130 between the nozzle tip and base portion biases the grooved end of the central shaft portion 122 into engagement with the union block nozzle cavity 106. In the position illustrated in FIG. 6B, the channels 122'–122''' permit the flow of molding material through the pathway 128, along the lines shown. Upon conclusion of the injection process, and removal of the extruder/injection assembly 40 from engagement with the mold clamp assembly 28, the spring member 130 biases the central shaft portion 122 with respect to the base portion 118, such that the channels 122" terminate within the base portion to prevent the flow of molding material through the pathway 128, as shown in FIG. 6A.

The nozzle tip 124 illustrated in FIGS. 5B–6B include a conical portion for mating engagement with a sprue opening 38 of the mold clamp assembly. This embodiment permits correction of some misalignment during the engagement of the nozzle tip with the mold clamp assembly 28. FIG. 7 illustrates an alternate embodiment of a nozzle tip 124*a* having a concave portion for mating engagement with a conical portion and adjacent groove portion surrounding the sprue opening of the mold clamp assembly. The mating engagement of the nozzle tip and mold clamp assembly assists with preventing separation of the top and bottom mold plates 32, 34 during injection.

Figure 8:
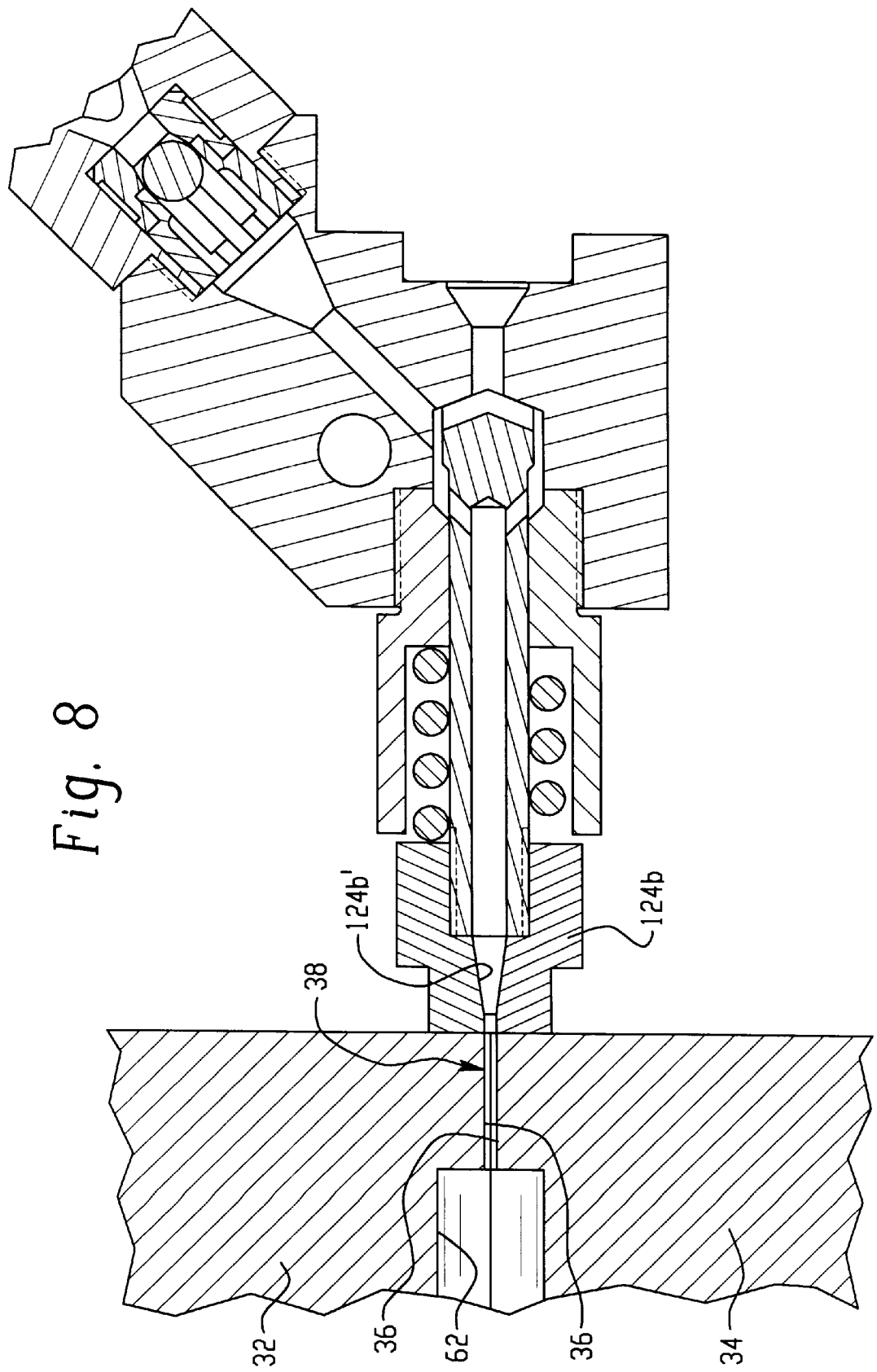
FIG. 8 is a still further alternate embodiment of the nozzle assembly of the movable extruder/injection apparatus of this application, shown in an open position engaged with the self-actuating mold clamp assembly for receiving the flow of molding material from the nozzle assembly.

FIG. 8 illustrates a still further alternate embodiment of a nozzle tip 124*b* having a flat end portion for aligned engagement with the sprue opening 38. The channel 124*b*' of the nozzle tip 124*b* is larger in diameter than the sprue opening 38.

The self-actuating mold clamp assembly 28 includes an injection cylinder for providing clamping engagement of the top and bottom mold plates 32, 34. In the embodiment of FIGS. 9–10, hydraulic cylinders 132 provide for application of a 2 ton clamping force to resist the injection pressure applied by the injection portion during injection. The illustrated spring clamp assembly 134 provides for the tilting action of the top and bottom mold plates previously discussed. In the embodiment of FIGS. 11–12, the hydraulic cylinders 132' preferably provide a 4 ton clamping force to resist the injection pressure applied during the injection of a larger shot size of molding material. A toggle assembly 136 is provided to enable the tilting action of the bottom mold plate 34.

Once the injection process is completed, the extruder/injection assembly 40 is moved by the shuttle assembly 42 to another work station 24 for the next injection process. The mold plates 32, 34 are then moved to the open position, and the molded parts M are removed from the clamping assembly 28 by the operator O. The conveyor system 52 of the apparatus 10 is then used by the operator O to remove the completed molded parts M from the work station 24. As shown in FIG. 2B, a center purge station 140 is also provided on the work table 22. The purge station 140 engages the nozzle assembly 50 to enable clean out of the nozzle assembly as may be necessary or desired, either for general cleaning purposes or prior to a material change.

Figure 13:
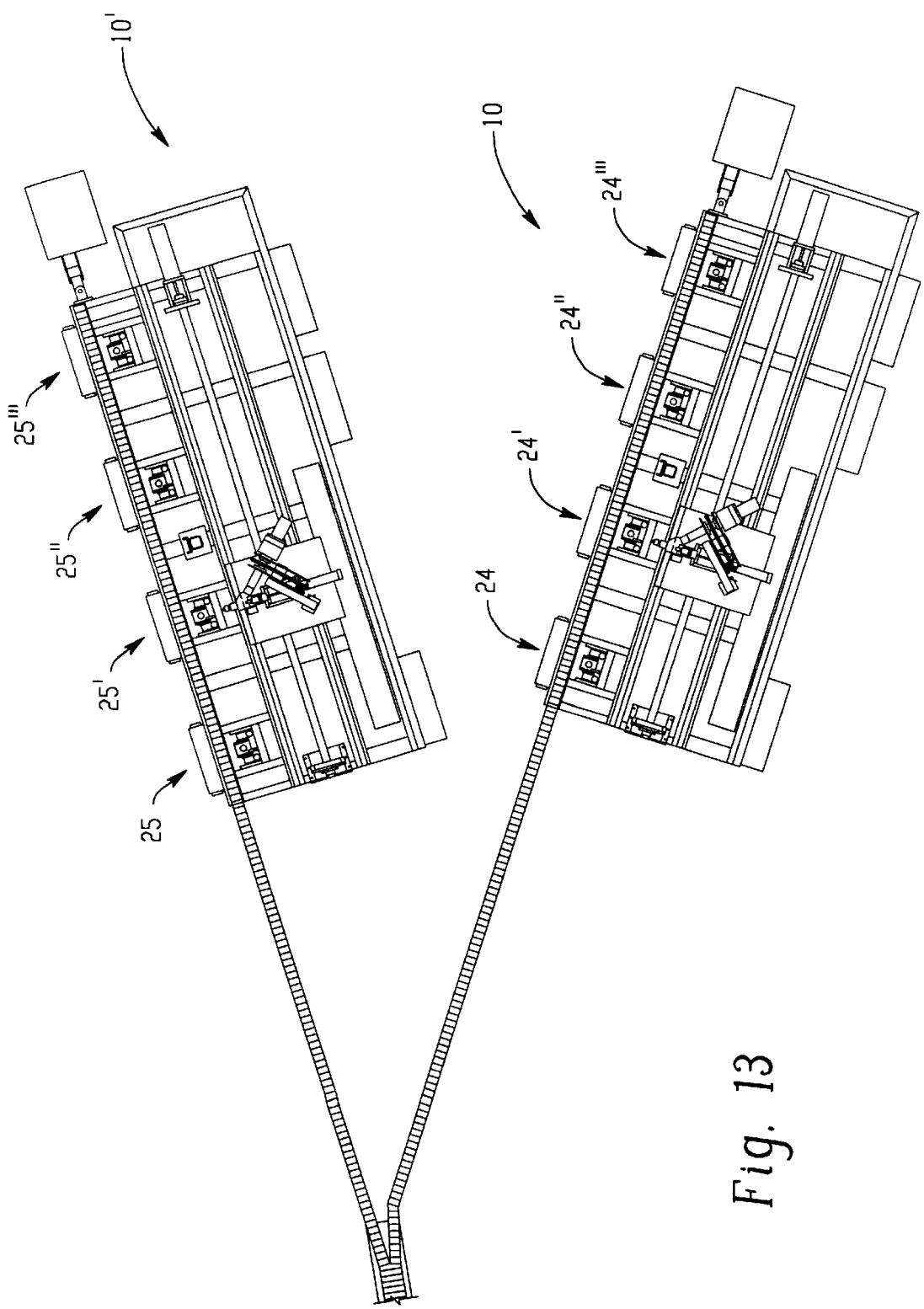
FIG. 13 is a schematic top view of an arrangement of multiple embodiments of the molding press apparatus.

The process of molding using the present apparatus 10 improves the molding process by reducing the amount of scrap resulting from the process. In prior art adhesive processes, the percentage of scrap material generated due to cosmetic and strength problems was substantial. Additionally, the present apparatus reduces the amount of cycle time, and the amount of floor space and labor cost to create the parts. As shown in FIG. 13, an additional molding press apparatus 10' which is identical to the molding press apparatus 10, having multiple work stations 25–25''', may also be interconnected by a supply conveyor to further increase the efficiencies obtained using the present device.

In the preferred and illustrated embodiment of the apparatus, a control system 54 is provided. The control system includes a conventional programmable computer for programming the predetermined desired settings of the apparatus and its components for operation of the apparatus. The computer and a conventional control panel provide programmed or manual instructions for a substantial number of machine functions, for example the initiation of injection by the extruder/injection assembly, and operation of the shuttle assembly to move the extruder/injection assembly to the next successive work station. The illustrated control panel is a EXYCOM control panel 56. However, any number of commercially available operator interface systems may be used. Additionally, the control system includes a dual palm control button 58 for safe operation of the molding press apparatus 10. The operator O must use both hands to activate the buttons as a safety precaution.

The preferred form of the molding press apparatus 10 has been described above. However, with the present disclosure in mind it is believed that obvious alterations to the preferred embodiment, to achieve comparable features and advantages in other assemblies, will become apparent to those of ordinary skill in the art.

What is claimed is:

1. An injection press apparatus for joining work pieces comprising:

a work table having first and second work stations where work pieces are joined, said first and second work stations including mounting structure for receiving said work pieces to be joined;

a movable extruder/injection assembly for charging extrusion material into said work stations, said extruder/injection assembly having an extruder portion for extruding material and an injection portion for injecting extrusion material for joining work pieces, and supporting a stock portion for feeding stock directly to said extruder portion;

said extruder portion and injection portion in fluid communication such that extrusion material is provided from said extruder portion to said injection portion;

said injection portion of said extruder/injection assembly having a nozzle assembly receiving material from said injection portion for injecting extrusion material to said first or second work stations;

said nozzle assembly having a first position allowing extrusion material to flow from said extruder portion to said injector portion but preventing extrusion material from flowing from said injection portion into said work stations, and a second position preventing extrusion material from flowing from said extruder portion to said injector portion but allowing extrusion material to flow from said injector portion to said work stations;

said first and second work stations including mounting structure for receiving said work pieces to be joined, and for engaging said nozzle assembly for supplying extrusion material for joining said work pieces, and a self-actuating mold clamp assembly having a generally clam shell configuration and supporting said mounting structure for receiving said work pieces and for engagement with said nozzle assembly for injecting material into said mold clamp assembly for joining said work pieces; and said movable extruder/injection assembly is repeatably moved between said first and second work stations by a shuttle assembly.

2. The apparatus of claim 1, further comprising a linear conveyor system positioned adjacent each of said work stations for providing said work pieces to said first and second work stations or for removing said work pieces from said first and second work stations.

3. The apparatus of claim 2, wherein said mold supports said mounting structure which comprises a removable mold insert.

4. The apparatus of claim 3, wherein said nozzle assembly of said extruder portion of said movable extruder/injection assembly includes a quick change, removable ball cartridge check valve engaged intermediate said extruder portion and said injection portion of said assembly for terminating the flow of material following injection.

5. The apparatus of claim 4, wherein said nozzle assembly includes a spring biased nozzle has a tip with an end configuration extending outwardly from said nozzle assembly for engagement with said first and second work stations.

6. The apparatus of claim 5, wherein said spring biased nozzle tip has a spherical end configuration.

7. The apparatus of claim 6, wherein said mounting structure includes an extension portion extending therefrom for engagement with said nozzle assembly, and said nozzle assembly includes a concave portion having an inner circumferential surface for engagement substantially surrounding said extension portion of said mounting structure to resist injection forces applied to said mounting structure during the injection operation.

8. The apparatus of claim 7, wherein said work stations include sprue openings for receiving material, and said nozzle assembly includes a channel for supplying material to said work stations, and said channel has a diameter larger than the diameters of the sprue openings.

9. The apparatus of claim 1, further comprising a linear conveyor system for providing said work pieces to said first and second work stations and for removing said work pieces from said first and second work stations.

10. A nozzle assembly for injecting material into a mold having a sprue opening for receiving material from an injection assembly and a groove portion substantially surrounding the sprue opening, said nozzle assembly comprising:

a nozzle tip engaged on one end with the sprue opening to supply material from the injection assembly to the mold;

a central shaft portion having first and second ends where said second end is engaged with said nozzle tip;

a base portion engaged with said first end of said central shaft portion;

a channel formed within said nozzle tip, central shaft portion and base portion, together providing a continuous pathway for supplying material to the mold;

a spring member engaged intermediate said base portion and nozzle tip, said first end of said spring member supported within a grooved portion of said base portion, and said second end of said spring member supported on an end of said nozzle tip opposite from an end of said nozzle tip engaged with the mold sprue opening;

said end of said nozzle tip engaged substantially surrounding the mold sprue opening and partially engaged within the grooved portion of the mold to resist injection forces applied to the mold during an injection operation wherein material is provided to the mold via said channel.

11. The assembly of claim 10, wherein the sprue opening extending from the mold has a substantially conical configuration, said end of said nozzle tip has a concave end configuration for mating engagement with the mold.

12. The assembly of claim 4, wherein said channel has a diameter larger than the diameter of the mold sprue opening.

* * * * *